(12) United States Patent
Maragno

(10) Patent No.: US 8,697,168 B2
(45) Date of Patent: Apr. 15, 2014

(54) TOOL FOR PREPARING RAVIOLI OR FILED PASTA IN GENERAL

(76) Inventor: Silvio Maragno, Canda (IT)

( * ) Notice: Subject to any disclaimer, the term of this patent is extended or adjusted under 35 U.S.C. 154(b) by 0 days.

(21) Appl. No.: 13/824,111

(22) PCT Filed: Aug. 4, 2011

(86) PCT No.: PCT/IB2011/053483
§ 371 (c)(1),
(2), (4) Date: Apr. 11, 2013

(87) PCT Pub. No.: WO2012/038844
PCT Pub. Date: Mar. 29, 2012

(65) Prior Publication Data
US 2013/0224351 A1  Aug. 29, 2013

(30) Foreign Application Priority Data

Sep. 24, 2010 (IT) .............................. PD2010A0283

(51) Int. Cl.
*A23L 1/16* (2006.01)
(52) U.S. Cl.
USPC ........... 426/557; 426/274; 426/275; 426/496; 426/512; 99/450.6; 99/450.2

(58) Field of Classification Search
USPC ......... 426/557, 274, 275, 496, 512; 99/450.6, 99/450.2
See application file for complete search history.

(56) References Cited

U.S. PATENT DOCUMENTS 4,574,088 A    3/1986  Bowden

FOREIGN PATENT DOCUMENTS

| FR | 767459 | 7/1934 |
|---|---|---|
| FR | 1081182 | 12/1954 |
| GB | 786428 | 11/1957 |
| GB | 2049537 | 12/1980 |
| GB | 2156648 | 10/1985 |
| WO | 0172133 | 10/2001 |

*Primary Examiner* — Lien T Tran
(74) *Attorney, Agent, or Firm* — Themis Law

(57) ABSTRACT

A new tool set for making homemade ravioli or filled pasta in general includes at least one flat grid provided with holes or openings, at least one flat cutting grid having blades arranged around each hole, at least one flat grid-shaped dispensing device suited to dispense portions of a filling and provided with holes or openings arranged exactly as each hole or opening of said grid, at least one flat ejecting device suited to eject portions of filling and provided with a series of projections suited to fit exactly in the holes or openings of the dispensing device.

11 Claims, 7 Drawing Sheets

TOOL FOR PREPARING RAVIOLI OR FILED PASTA IN GENERAL

The present patent relates to cooking tools and utensils, and particularly to tools and utensils for the preparation, especially at home, of ravioli or filled pasta in general.

BACKGROUND OF THE INVENTION

It is common knowledge that filled pasta, such as ravioli, comprises a filling that is wrapped in and/or surrounded by a portion of thin, flat dough.

Two overlapping portions of thin, flat dough are used to prepare ravioli, with a suitable quantity of filling inserted between them. The two portions of dough are then pressed and joined around the filling and along the edges, then cut to separate the ravioli from one another.

Ravioli and other types of filled pasta can be prepared at home.

Preparing ravioli normally involves:
preparing and rolling out a thin layer of dough;
preparing the filling and placing it in small portions, generally in equidistant positions, on the surface of the dough;
placing a second thin layer of dough over the portions of filling and the previous layer of dough;
pressing the two layers of dough together around the portions of filling; and
cutting the two layers of dough pressed and joined around the portions of filling, normally with a knife or pastry wheel, so as to separate them into individual parts consisting of two dough layers joined together, each enclosing a portion of filling.

This procedure has several drawbacks:
it takes a considerable amount of time to collect each portion of filling from the filling mixture and place it on the thin layer of dough;
it is not easy to measure equal quantities of filling, with the result that some ravioli contain more filling than others;
it is not easy to position the individual portions of filling on the thin layer of dough at equal distances from one another;
it is not easy to position the individual portions of filling so as to leave an adequate—no more nor less than necessary—amount of dough around the individual portions of filling; it is not easy to produce ravioli or filled pasta all of the same shape and size; and
it is not easy to press the dough adequately around the individual portions of filling so as to ensure that the ravioli or filled pasta do not come open when they are cooked.

SUMMARY OF THE INVENTION

A new tool set for making home-made ravioli or filled pasta in general has been studied and produced in order to overcome all the above-mentioned drawbacks.

One object of the new tool set is to make it easier to measure the individual portions of filling.

Another object of the new tool set is to ensure that each portion of filling always contains the same quantity of filling mixture.

Another object of the new tool set is to allow the individual portions of filling to be positioned more rapidly and more precisely, at the same distance from one another.

Another object of the new tool set is to make it possible to produce ravioli or filled pasta having more uniform dimensions.

Another object of the new tool set is to allow the dough to be pressed adequately around the individual portions of filling.

Another object of the new tool set is to enable the individual ravioli or the individual portions of filled pasta to be separated more easily.

Another object of the new tool set is to enable anybody to prepare ravioli or filled pasta, enabling even the least expert to obtain excellent results and making the process more straightforward, the product more uniform and the procedure more efficient.

The new tool set is simple and inexpensive to manufacture, and suitable for being made using various materials, e.g. plastic or metal alloys or wood; it includes no electrical devices and is not liable to breakage, or wear and tear; it requires no particular maintenance and it poses none of the drawbacks detectable in the known systems for making ravioli or filled pasta at home.

The new tool set is thus an economical and practical solution for making home-made ravioli or filled pasta, achieving excellent results, saving time and assuring the utmost satisfaction.

These and other direct and complementary objects are achieved by the new tool set for preparing ravioli and filled pasta in general, which comprises:
a guide frame;
two grid-like frames, hereinafter simply called grids;
a frame with cutting blades in a grid-like arrangement, hereinafter called the cutting grid;
a grid-like device for dispensing portions of filling, hereinafter called the dispensing device;
a piston-type device for ejecting portions of filling, hereinafter called the ejecting device;
a tray.

The guide frame comprises strips or other linear elements arranged so as to form a square, or preferably a rectangle, defining an internal rectangular space.

Said strips or linear elements may have a square or rectangular cross-section, or preferably an L-shaped cross-section with a horizontal projection facing towards the outside of said guide frame.

Each grid has a plane, rectangular or square shape designed to fit exactly inside the guide frame. The thickness of each grid is such that when the two grids are placed one over the other they can be contained inside said guide frame without substantially extending from the cavity inside said guide frame.

Each one of said grids is provided with holes or openings arranged substantially in rows and columns so as to define a grid of equal and equidistant holes and openings.

Said holes or openings may also have a shape different from the square or rectangle, e.g. a triangle, a circle, a semicircle etc. In this case said holes or openings are uniformly and appropriately arranged on the grid.

The area of each hole or opening in said grids basically determines the size of each raviolo or filled pasta unit that will be obtained. The rim between each hole or opening in said grid and the adjacent holes or openings is basically flat and shaped so as to define the shape of the ravioli or filled pasta units to be obtained. The width of said rim determines the surface area of the pressed edge around the filling.

The cutting grid has a plane shape designed to fit exactly inside the guide frame and is provided with holes, openings or recesses arranged identically to those of the above-described grid.

The cutting grid comprises blades arranged around each hole, opening or recess—lying orthogonally to the plane of said cutting grid and projecting from its thickness—which may be straight or in other shapes.

Basically, said cutting grid comprises blades arranged along the midline of each rim between two adjacent holes, openings or recesses, and in the median part of the rim around the perimeter of said cutting grid. The cutting blades are shaped so as to define the shape and size of the ravioli or filled pasta units to be obtained.

The dispensing device has a plane shape and is provided with holes or openings, except for a band around its perimeter coinciding with its edge.

Said holes or openings are arranged substantially in rows and columns so as to define a grid of equal and equidistant holes or openings. Each hole or opening in the dispensing device has a surface area that is equal to or smaller than the area of each hole or opening in the grids.

The space determined by the area of each hole or opening in the dispensing device and by the thickness of the dispensing device basically determines the volume of each portion of filling.

The surface area of each hole in the dispensing device is preferably approximately two fifths of the surface area of each hole or opening in the grids.

Along its outer edge, said dispensing device has an orthogonal raised lip that delimits one of the two greater surfaces of said dispensing device, constituting a raised perimeter edge. The width of the band coming between the raised perimeter edge and the holes or openings in the dispensing device is such as to allow the dispensing device, which engages with the guide frame, to perform a lateral movement roughly corresponding to the distance between the centres of two adjacent holes or openings in said dispensing device.

In a preferred embodiment, said dispensing device contains a number of holes or openings, in each direction (along its width and length), that is twice the number of holes or openings in each grid, so that when said dispensing device is placed over a grid, the holes or openings in the dispensing device are alternately centered with the holes or openings in the grid underneath.

The ejecting device consists of a plane element of a size such that it can support, on one side, a series of precisely sized projections with a cross-section designed to fit exactly inside the holes or openings in the dispensing device, but of a height greater than the thickness of said dispensing device, distributed in rows and columns and with their axis coinciding with the axis of the holes or openings in each one of the grids.

The projections of said ejecting device are placed over and centered with the holes or openings in a grid.

The new tool set for making home-made ravioli and filled pasta in general is conveniently used as follows.

A sufficient quantity of filling is prepared with the ingredients of the user's choice.

This filling is pressed and pushed inside the holes or openings in the dispensing device so that each hole or opening in said dispensing device is filled to capacity with the filling mixture. Any excess filling mixture around said holes or openings, or on other parts of the dispensing device, is removed, using a spatula for instance.

A sufficient quantity of pasta dough is rolled out in a thin layer and cut with a pastry wheel, or other suitable utensil, into portions corresponding to the space inside the guide frame. To facilitate this process, one of the grids can be placed over the rolled dough so that the latter can be cut along the outer perimeter edge of the grid.

The guide frame is placed on a worktop so that its greater surface rests on said worktop.

A first grid with holes or openings is inserted in the space inside said guide frame.

A portion of rolled dough suitably cut to size is placed on said grid inside said guide frame.

The dispensing device is placed over the guide frame with its raised perimeter edge facing downwards, towards the worktop, and subsequently moved diagonally until two sides of the raised perimeter edge engage with and adhere to two sides of the guide frame on which the dispensing device rests, thereby establishing the position in which the device is retained.

In this position, a set of holes or openings in said dispensing device comes to be aligned and centred with the holes or openings in the grid underneath, contained inside the guide frame.

The same result is obtained by moving the dispensing device diagonally in all directions until it comes to a stop; the result is a self-centering function of the holes contained in the dispensing device in relation to the holes contained in the grid underneath. The ejecting device is placed over said dispensing device, once the latter has been stopped in position as described above, so that the projections of said ejecting device face downwards and towards said worktop, and are aligned and centered with the holes or openings in the dispensing device, which are in turn aligned and centered with the holes or openings in the grid underneath.

The ejecting device is pressed down so that its projections penetrate inside the holes or openings in the dispensing device with which they are aligned and centered, thereby ejecting the portions of filling contained in the holes or openings in the dispensing device onto the layer of dough and the grid underneath.

Each portion of filling is thus ejected from the dispensing device and pressed onto the layer of dough underneath, which—under the pressure of the filling, acquires a concave shape coinciding with each hole or opening in the grid underneath, so that it can better contain the portion of filling.

The dispensing device and the ejecting device are then removed and set aside for subsequent use.

A second portion of rolled dough suitably cut to size is placed inside the guide frame so that it covers the portions of filling and the layer of dough already contained inside said guide frame.

The second grid is then placed inside said guide frame so that it lies over and is aligned with the first grid placed inside the guide frame and on the worktop.

Said second grid is then pressed downwards onto said first grid so as to press and join the two layers of dough along the edges between the holes in the grids.

In particular, the edges between the holes or openings in the one and the other grid press and join the two layers of dough surrounding and enclosing the individual portions of filling. The upper grid is then removed and set aside for subsequent use.

The cutting grid is placed inside said guide frame so that it lies over and is aligned with the first grid situated inside the guide frame and on the worktop. In particular, said cutting grid is inserted in the guide frame with its blades facing downwards and towards the first grid underneath it, contained inside the guide frame.

A subsequent downward pressure on said cutting grid towards the grid underneath makes the blades cut the two overlapping and joined layers of dough along the midline of each rim between two adjacent holes or openings in the grid, and along the midline of the perimeter edge of said grid, thereby separating each part of dough and filling contained in a single hole or opening in the grid and corresponding to an individual raviolo or filled pasta unit.

Finally, when the cutting grid is separated from the first grid underneath and from the guide frame, all the resulting individual ravioli or individual filled pasta units can be collected.

The various parts of the tool set can be repeatedly dusted with flour during the procedure for making the ravioli to make it easier to detach the dough from the tools. For this purpose, a tray with closed bottom is provided, designed to contain the flour in which to dip the various components of the new tool set as necessary. Said tray can also be conveniently used to contain the various parts of the new tool set when they are to be stored away.

It is also possible for the holes in said grids to be triangular, in which case the holes in said dispensing device are also triangular and they consequently overlap and are centered with said triangular holes in said grids.

In particular, to ensure the proper alignment and centering of all the holes or openings in the dispensing device with the holes in the grids, a removable spacer is used, suitably sized so that it can be inserted between the guide frame and the raised perimeter edge of the dispensing device when the latter is used to place the portions of filling in position. In this case, the precisely sized triangular projections of said ejecting device are arranged so that their axis can coincide with the axis of the holes or openings in the dispensing device and in each one of the grids. To enable the ejection of all the portions of filling, said ejecting device is conveniently rotated through 180° around its own axis, orthogonally to the grids and to the dispensing device, so that action can be taken on all the holes in the dispensing device.

To facilitate the procedure for cleaning the kit before it is stored away, a cleaning tool is provided, particularly for the dispensing device, which comprises a panel or pad to which cleaning elements—such as twisted wires or plastic pins, each carrying stiff, or slightly flexible radial wires attached orthogonally all along their length—are arranged so as to coincide with the holes in the dispensing device. Said cleaning tool is conveniently used by inserting and rubbing said cleaning elements inside the holes or openings in the dispensing device.

BRIEF DESCRIPTION OF THE DRAWINGS

The characteristics of the new tool set for making home-made ravioli and filled pasta in general are further clarified in the description given below with reference to the drawings, which are attached as a non-limiting example.

The attached drawings provide a non-limiting example of a practical embodiment of the invention.

FIGS. 1-16 show the component parts of the new tool set and steps for the process for making home-made ravioli and filled pasta in general, comprising:

FIG. 1: a guide frame (A);
FIG. 2: two grids (B', B");
FIG. 3: a cutting grid (C);
FIG. 4: a grid-like device (D) for dispensing portions of filling (R);
FIG. 5: a device (E) for ejecting portions of filling (R),
and
FIG. 6: a tray (F).
FIG. 7: utensil (G) for cleaning the dispensing device (D);
FIG. 8: disposing the guide frame (A) on a worktop (T) to receive dough (P');
FIG. 9: positioning the ejecting device (E) over the dispensing device (D);
FIG. 10: placing a second portion of dough (P") over the guide frame (A);
FIG. 11: aligning the second grid (B") inside the guide frame (A) onto the first grid (B');
FIG. 12: placing the cutting grid (C) inside the guide frame (A);
FIG. 13: separating the cutting grid (C) from the first grid (B'), to collect the ravioli;
FIG. 15: third embodiment of the first and second grids (B', B");
FIG. 16: fourth embodiment of the first and second grids (B', B").

DETAILED DESCRIPTION OF EMBODIMENTS OF THE INVENTION

Figure 1:
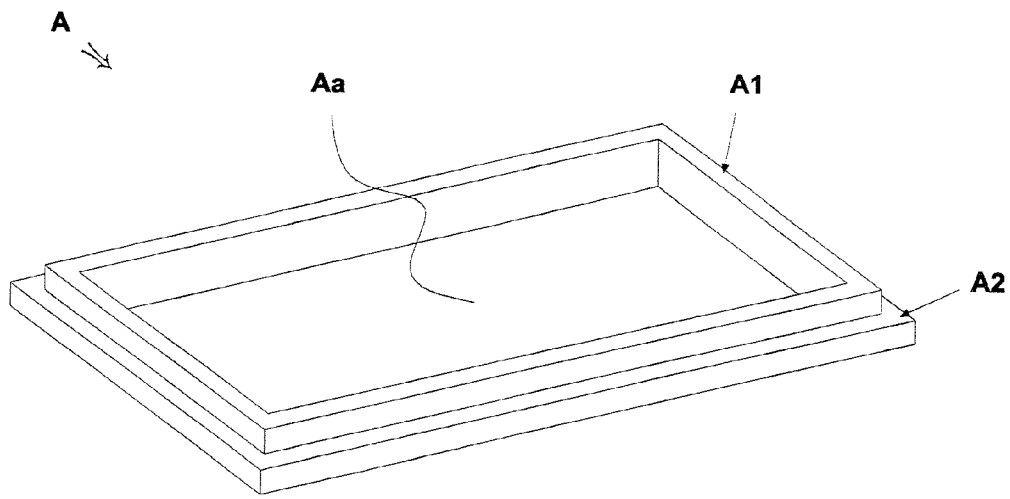

The guide frame (A), shown in FIG. 1, comprises strips or other linear elements (Al) arranged in a rectangle defining an internal, rectangular space (Aa).

In a preferred embodiment, said strips or linear elements (A1) have an L-shaped cross-section with the horizontal projection (A2) facing outwards from said guide frame (A).

Figure 2:
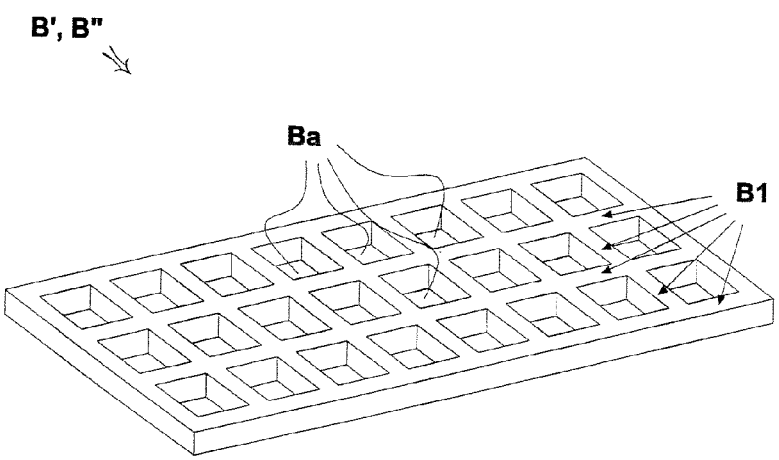

As shown in FIG. 2, each grid (B', B") has a plane, rectangular shape designed to fit exactly inside the guide frame (A). The thickness of each grid (B', B") is such that when the two grids (B', B") are placed one over the other they can be contained inside said guide frame (A) basically without extending from said cavity (Aa) inside said guide frame (A).

Each one of said grids (B', B") has holes or openings (Ba) arranged basically in rows and columns so as to define a grid of equal and equidistant holes or openings (Ba).

The surface area of each hole or opening (Ba) in said grids (B', B") basically determines the size of each raviolo or filled pasta unit that will be prepared.

The edge (B1) between each hole or opening (Ba) in said grid (B', B") and the adjacent holes or openings (Ba) is basically flat and twice the width of the joined and pressed edge of each raviolo or filled pasta unit to be obtained.

Figure 3:
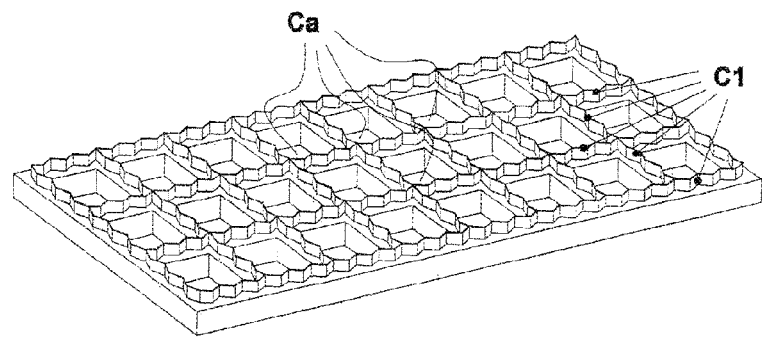

The cutting grid (C), shown upside down in FIG. 3, has a plane shape of a size designed to fit exactly inside the guide frame (A) and is provided with holes, openings or recesses (Ca) coinciding with and arranged identically to those of the two above-mentioned grids (B', B").

The cutting grid (C) comprises blades (C1) arranged around each hole, opening or recess (Ca), lying orthogonally to the plane of the cutting grid (C) and extending from the thickness thereof.

Figure 4:
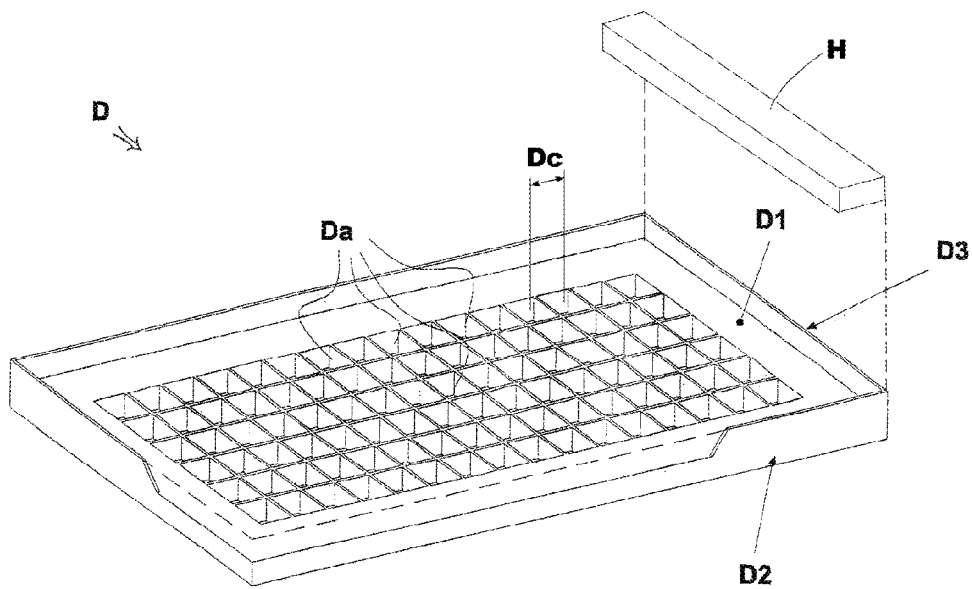

The dispensing device (D), shown upside down in FIG. 4, has a plane shape and larger dimensions than the two grids (B', B") and the guide frame (A).

Said dispensing device (D) is provided with holes or openings (Da) except for a perimeter strip (D1) coinciding with the edge (D2).

These holes or openings (Da) are arranged basically in rows and columns so as to define a grid of equal and equidistant holes or openings (Da).

Each hole or opening (Da) in the dispensing device (D) has a surface area that is equal to or less than the surface area of each hole or opening (Ba) in each one of the grids (B', B"). The volume determined by the area of each hole or opening (Da) in the dispensing device (D) and by the thickness of the dispensing device (D) determines the quantity of each portion of filling (R).

Along the edge (D2) of said dispensing device (D) there is a wall (D3) lying orthogonally to the greater surface of the dispensing device (D), which forms a raised perimeter edge.

The band (D1) coming between the raised perimeter wall (D3) and the holes or openings (Da) in the dispensing device (D) is such that the dispensing device (D), when placed over the guide frame (A), is allowed to perform a lateral movement in each direction approximately equating to the distance Dc between the centers of two adjacent holes or openings (Da).

The lateral movement of the dispensing device (D) limited by the raised perimeter wall (D3) that engages with the guide frame (A) must be sufficient to enable the alignment and centring of all the holes or openings (Da) in the dispensing device with the holes or openings (Ba) in each grid (B', B"). In a preferred embodiment, said dispensing device (D) has a number of holes or openings (Da) for each row or column that is twice the number of holes or openings (Ba) in each row or column in each one of the grids (B', B") so that, when said dispensing device (D) is placed over a grid (B', B"), the holes or openings (Da) in the dispensing device (D) are alternately centered with holes or openings (Ba) in the grid (B', B").

Figure 5:
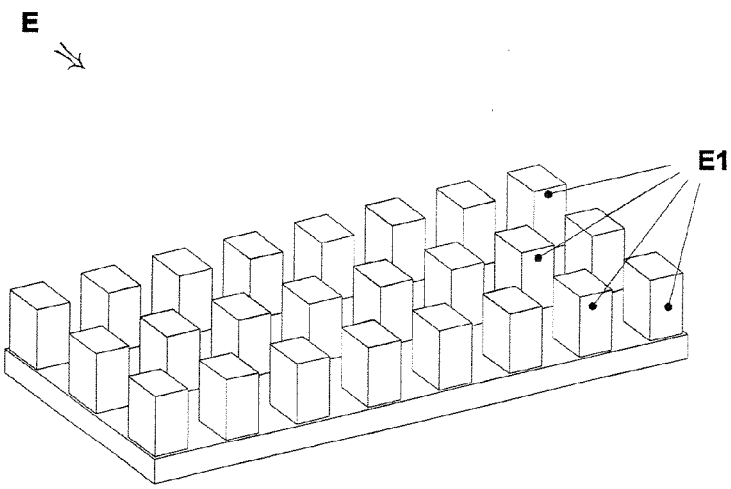

The ejecting device (E), shown upside down in FIG. 5, comprises a plane-shaped element of a size sufficient to support a number of projections (E1) with a precisely sized cross-section suited to fit exactly inside the holes or openings (Da) in the dispensing device (D) but with a height that is greater than the thickness of said dispensing device (D), and arranged on rows and columns corresponding to the holes or openings (Ba) in each one of the grids (B', B").

Basically, when said ejecting device (E) is placed over and centered with a grid (B', B"), the projections (E1) of said ejecting device (E) come to be centered with the holes or openings (Ba) in said grid (B', B").

Figure 6:
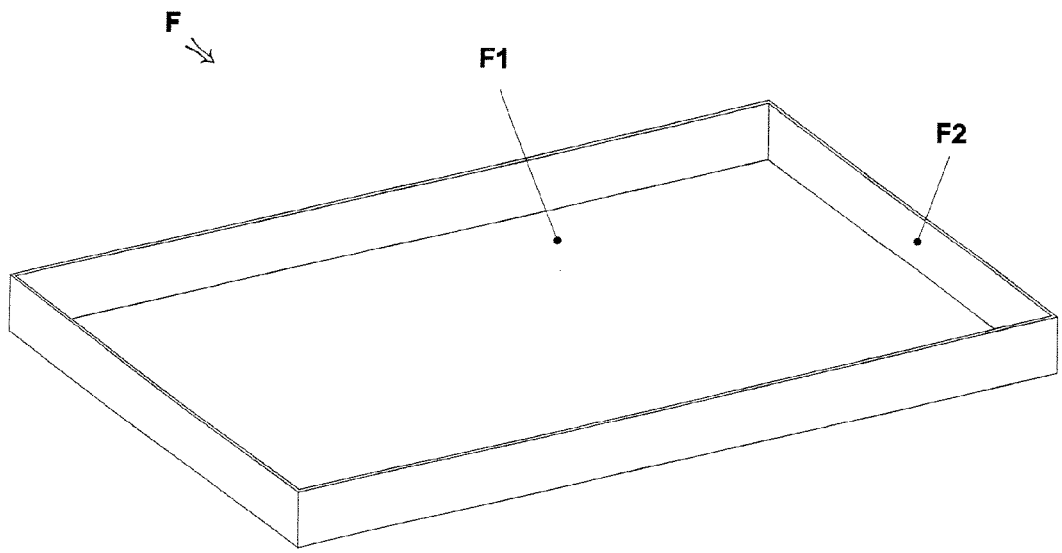

The tray (F), shown in FIG. 6, comprises an underside (F1) and a perimeter rim (F2) lying orthogonally to said underside (F1), and its size is designed to contain at least the cutting grid (C) and the grids (B', B") placed one over the other but it can also contain and support the guide frame (A) and support the dispensing device (D) for the easy storage of the kit.

Figure 7:
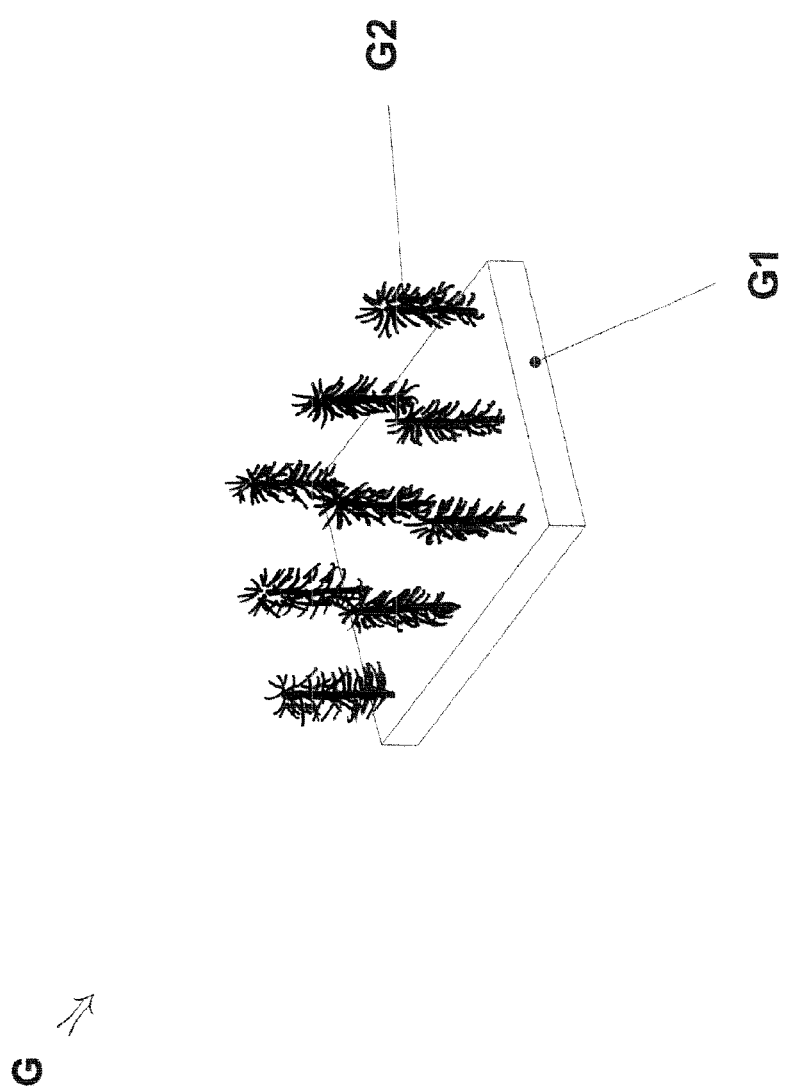

FIG. 7 shows a utensil (G) for cleaning the dispensing device (D), comprising a panel or pad (G1), with cleaning elements (G1), such as twisted wires or plastic pins (each with stiff, or slightly flexible radial wires attached along its full length) orthogonally attached thereto and centred with the holes in the dispensing device (D). Said cleaning utensil (G) is conveniently used by inserting and rubbing said cleaning elements (G1) of the cleaning utensil (G) inside the holes or openings (Da) in the dispensing device (D).

The new tool set for making home-made ravioli and filled pasta in general is used as described below, and as illustrated in FIGS. 8, 9, 10, 11, 12, 13.

A sufficient quantity of filling (R) is prepared with ingredients of the user's choice.

Said filling is pressed and pushed inside the holes or openings (Da) in the dispensing device (D) so that each hole or opening (Da) in said dispensing device (D) is filled to capacity with the filling mixture (R). Any excess filling mixture (R) remaining around said holes or openings (Da), or on other parts of the dispensing device (D) is removed, with the aid of a spatula for instance.

A sufficient quantity of dough (P', P") is prepared and rolled out and then cut into portions the same size as the space inside the guide frame (A); to facilitate this procedure, a grid (B) is placed over the rolled dough and the dough is cut with a pastry wheel or knife along the outer perimeter edge of the grid (B).

Figure 8:
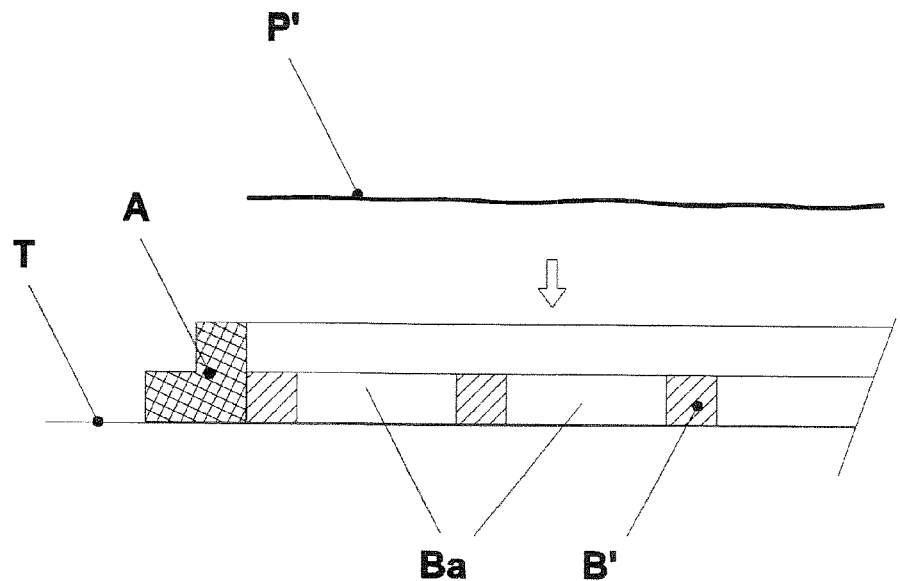

As shown in FIG. 8, the guide frame (A) is placed on a worktop (T) so that the wider edge (A2) of the L-shaped cross-section of its perimeter edge (A1) rests on said worktop (T).

A first grid (B') with holes or openings (Ba) is placed in the space (Aa) inside said guide frame (A).

A first portion of rolled dough (P') cut to size is placed over said grid (B') inside said guide frame (A).

Figure 9:
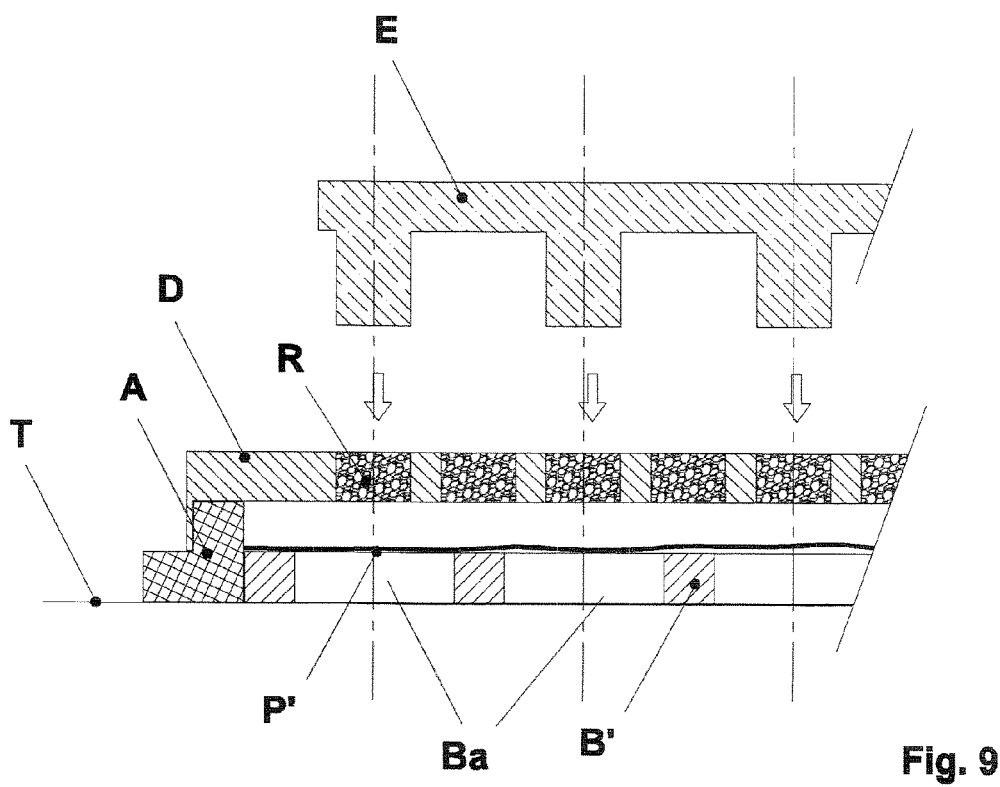

FIG. 9 shows how the dispensing device (D) is then positioned on the guide frame (A) with its raised perimeter wall (D3) facing downwards, towards the worktop (T), and with the corner between two sides (D3) of said dispensing device (D) adhering to the corner between two walls (A1) of said guide frame (A), thereby establishing a fixed position in which the dispensing device (D) stops in relation to the guide frame (A).

In this position, a set of holes or openings (Da) in said dispensing device (D) comes to be aligned and centered with the holes or openings (Ba) in the grid (B') underneath, contained inside the guide frame (A).

The ejecting device (E) is placed on said dispensing device (D) so that the projections (E1) of said ejecting device (E) face downwards and towards said worktop (T), and are aligned and centered with the holes or openings (Da) in the dispensing device (D), which are in turn aligned and centered with the holes or openings (Ba) in the grid (B') underneath.

The ejecting device (E) is then pressed downwards so that its projections (El) penetrate inside said holes or openings (Da) in the dispensing device (D) with which they are aligned and centered, transferring the portions of filling (R) contained in the holes or openings (Da) in the dispensing device (D) onto the dough (P') and the grid (B') underneath.

Each portion of filling (R) ejected from the dispensing device (D) is thus pressed onto the layer of dough (P') underneath, basically in the centre of a hole or opening (Ba) in the grid (B') below.

The dispensing device (D) and the ejecting device (E) are then removed and set aside for subsequent use.

Figure 10:
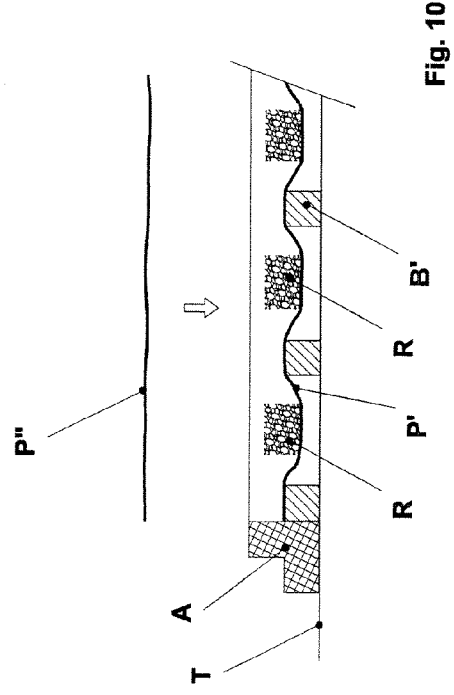

As shown in FIG. 10, a second portion of rolled dough (P") is placed in the guide frame (A) so as to cover the filling (R) and the layer of dough (P') contained inside said guide frame (A).

Figure 11:
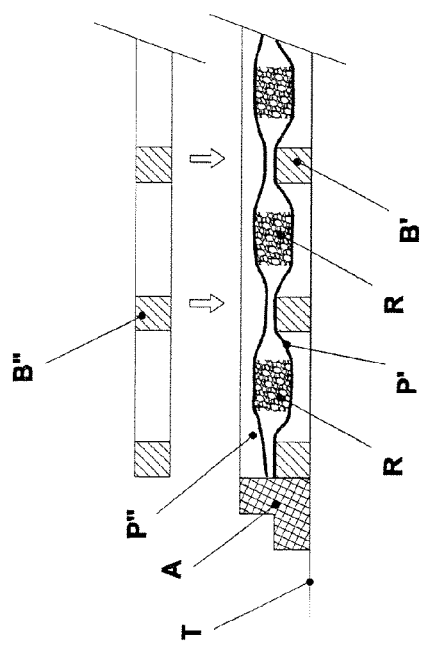

FIG. 11 shows the next step, in which the second grid (B") is placed inside said guide frame (A) so that it lies on and is aligned with the first grid (B') placed inside the guide frame (A) on the worktop (T).

Said second grid (B") is pressed downwards onto said first grid (B') so as to press and join the two layers of dough (P', P") around the filling (R).

In particular, the edges (B1) between the holes or openings (Ba) in the one grid (B') and in the other grid (B") are pressed together and join the two layers of dough (P', P") enclosing the individual portions of filling (R).

The upper grid (B") is then removed and set aside for subsequent use.

Figure 12:
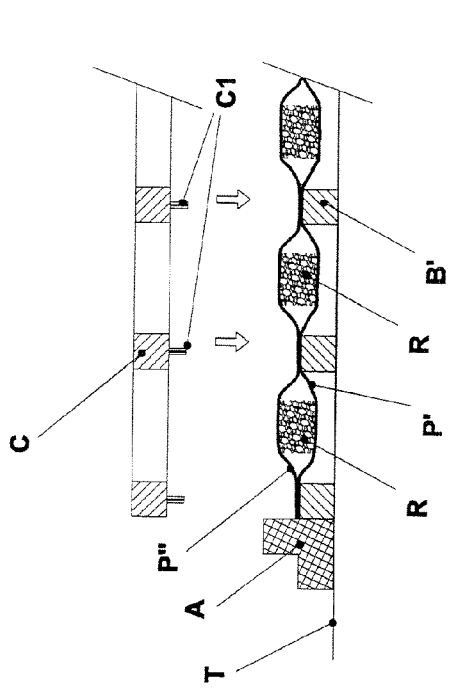

The cutting grid (C) is placed inside said guide frame (A), as shown in FIG. 12, so that it lies over and is aligned with the first grid (B') inside the guide frame (A) resting on the worktop (T). In particular, said cutting grid (C) is inserted in the guide frame (A) with its blades (C1) facing downwards towards the first grid (B') underneath, contained inside the guide frame (A).

A subsequent pressure on said cutting grid (C) makes the blades (C1) cut through the two joined dough layers (P', P")

lying one over the other, along the midline of each edge (B1) between two adjacent holes or openings (Ba) in the grid (B'), and along the midline of the rim around the perimeter of the grid (B'), separating each part of dough (P', P") and filling (R) contained inside a single hole or opening (Ba) in the grid (B') and corresponding to an individual raviolo or filled pasta element.

Figure 13:
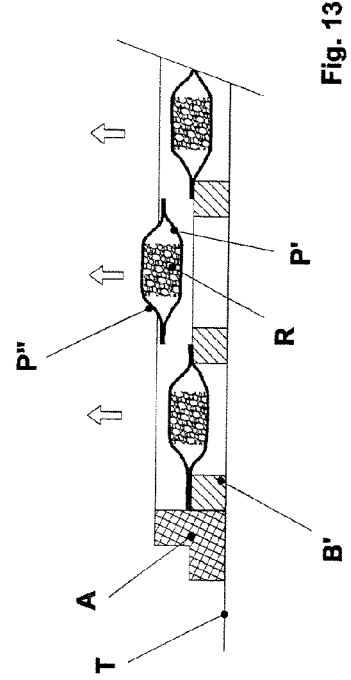

Finally, as shown in FIG. 13, the cutting grid (C) can be separated from the first grid (B') underneath it and from the guide frame (A) to enable all the resulting individual ravioli or filled pasta units to be collected.

Figure 14A:
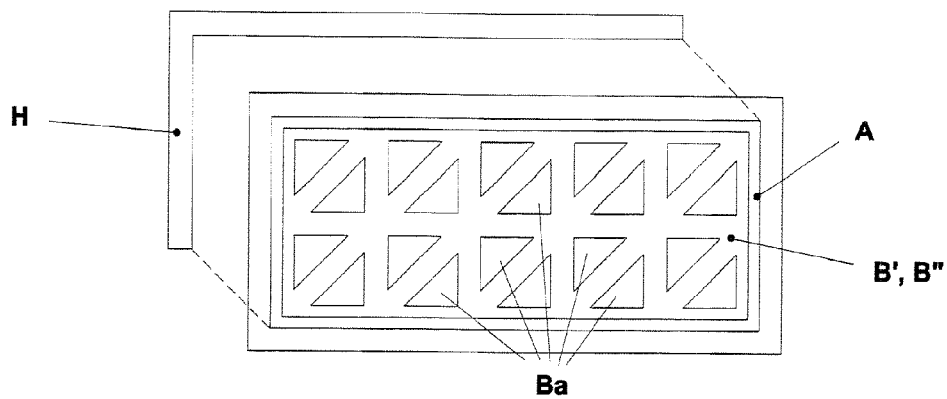
FIGS. 14a and 14b: second embodiment of the first and second grids (B', B") and of the dispensing device (D)
Figure 14B:
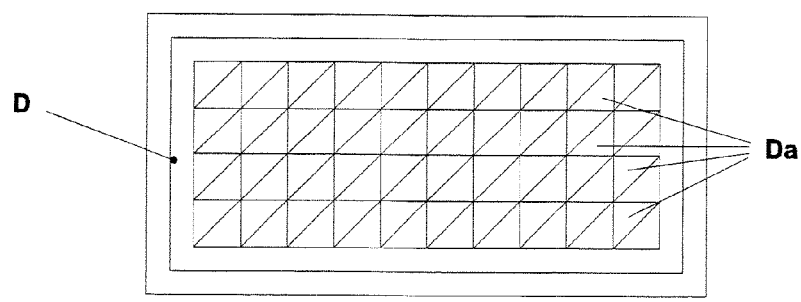

FIGS. 14a and 14b show a second embodiment of the grids (B', B") and dispensing device (D). In this embodiment, the grids (B', B") have triangular holes or openings (Ba), arranged in opposite pairs, and basically in rows and columns so as to define a grid of equal and equidistant holes or openings (Ba). The dispensing device (D) has identical triangular holes or openings (Da), identically arranged in opposite pairs and substantially in rows and columns.

The size of the holes or openings (Da) in the dispensing device (D) is the same as, or smaller than the size of the holes or openings (Ba) in the grids (B', B").

A suitable ejecting device (E) with triangular projections (El) is also provided, even if not shown.

In this case, to enable the centering of the various holes or openings (Da) in the dispensing device (D) with the holes or openings (Ba) in the grids (B', B") and to ensure that all the portions of filling (R) can be positioned correctly on the layer of rolled dough (P'), it becomes necessary to use a spacer element (H) to be inserted laterally between the guide frame (A) containing the first grid (B') and the dispensing device (D) placed over the guide frame (A).

Figure 15:
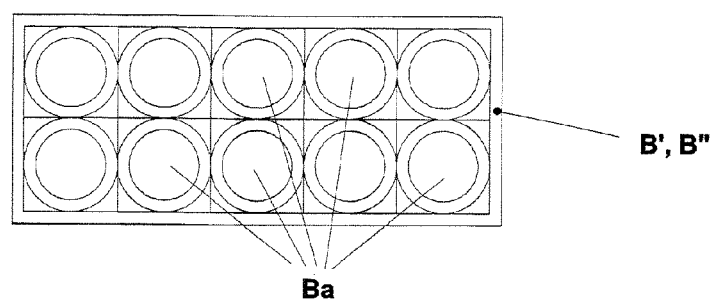
Figure 16:
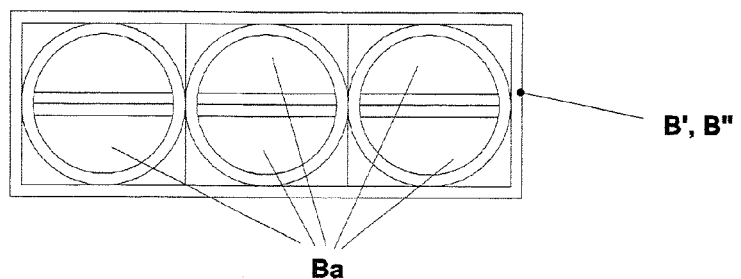

FIGS. 15 and 16 show two further embodiments of the grids (B', B") with circular and semicircular holes or openings (Ba), respectively. For these grids (B', B") a dispensing device (D) as described above may be used but with square or rectangular holes, and with a corresponding ejecting device (E).

These are schematically the details needed for a person skilled in the art to manufacture the new tools; of course, in the practical application of the invention, structurally and functionally equivalent variants may be made (mainly relating to different shapes and sizes of ravioli and filled pasta units to be obtained) that shall nonetheless come within the scope of the invention protected by this patent.

Thus, with reference to the above description and to the attached drawings, the following claims are expressed.

The invention claimed is:

1. A tool set for making homemade ravioli or filled pasta in general, comprising:
   at least one first grid (B') having a plane shape and provided with first holes or openings (Ba) substantially arranged in rows and columns;
   at least one second grid (B") identical to said first grid (B');
   at least one cutting grid (C) having a plane shape substantially equal to that of said first grid (B'), provided with second holes or openings (Ca) arranged exactly in a same way as each hole or opening of said first grid (B'), each of said second holes or openings (Ca) having blades (C1) that are arranged thereabout and orthogonal to the plane of the cutting grid (C) and projecting therefrom;
   at least one grid-shaped dispensing device (D) configured to dispense portions of a filling (R), said dispensing device having a plane shape and being provided with third holes (Da), all or some of which are arranged exactly in the same way as each hole or opening of said first grid (B'), said dispensing device (D) being provided with a raised perimeter portion (D3) along an edge (D2);
   at least one ejecting device (E) configured to eject portions of the filling (R), said ejecting device being provided with a series of projections (E1) whose cross section is sized to fit precisely in the third holes or openings (Da) of the dispensing device (D), and whose height is equal to or exceeds a thickness of said dispensing device (D), said projections (E1) being distributed on rows and columns and being complementary to the first holes or openings (Ba) of the first grid (B'); and
   a guide frame (A) having linear elements (A1) arranged in a square or rectangular pattern such to enclose a central area (Aa) containing and guiding said first grid (B') and said cutting grid (C), wherein said guide frame (A) is configured to support and guide said dispensing device (D).

2. The tool set according to claim 1, wherein the linear elements (A1) of said guide frame (A) have an L-shaped cross section with a horizontal projection (A2) facing towards an outside of the guide frame (A).

3. The tool set according to claim 1, wherein each of the third holes or openings (Da) of said dispensing device (D) has a surface area that is smaller than a surface area of each of the first holes or openings (Ba) of said first and second grids (B', B").

4. The tool set according to claim 1, wherein each of the third holes or openings (Da) of said dispensing device (D) has a surface area that is equal to a surface area of each of the first holes or openings (Ba) of said first and second grids (B', B").

5. The tool set according to claim 1, wherein said dispensing device (D) has a larger number of the third holes or openings (Da) than a number of the first holes or openings (Ba) of each of the first and second grids (B', B").

6. The tool set according to claim 1, further comprising a perimeter strip (D1) in the dispensing device (D) included between the third holes (Da) and the raised perimeter portion (D3), said perimeter strip being dimensioned to cause the raised perimeter portion to extend outwardly beyond said guide frame such that said dispensing device (D) is enabled to move laterally, widthwise or lengthwise, on said guide frame (A) and to alternately align the third holes (Da) of said dispensing device (D) with the first holes or openings (Ba) of the first or second grid (B', B") housed in said guide frame (A).

7. The tool set according to claim 6, wherein the perimeter strip (D1) of the dispensing device (D) included between the third holes (Da) and the raised perimeter portion (D3) is dimensioned as wide as a distance between center points of two adjacent third holes (Da).

8. The tool set according to claim 1, further comprising a spacer element (H) configured to be inserted laterally between the guide frame (A) containing the first grid (B') and the dispensing device (D) resting on the guide frame (A), such to align said third holes (Da) of said dispensing device (D) with the first holes or openings (Ba) of the first grid (B') housed in said guide frame (A).

9. The tool set according to claim 1, further comprising a tray (F) with a closed bottom configured to contain flour in which to immerse other parts of the tool set when desired and to store the various parts of the tool set.

10. The tool set according to the claim 1, further comprising a cleaning element (G) having a plane element (G1) and projections (G2) provided with wires or pins extending from said plane element (G1).

11. A method for making homemade ravioli or filled pasta in general comprising the following steps:
   providing a tool set according to claim 1;
   positioning the guide frame (A) on a worktop (T);

inserting the first grid (B') in the internal space (Aa) of said guide frame (A);

positioning a first portion of rolled dough (P') on said first grid (B') inside said guide frame (A);

positioning said dispensing device (D), having individual portions of the filling (R) filling the third holes therein, on the guide frame (A) with the raised perimeter portion (D3) facing downwards towards the worktop (T) and with an angle included between two raised perimeter portions (D3) of said dispensing device (D) matching an angle between two linear elements (A1) of said guide frame (A);

positioning said ejecting device (E) on said dispensing device (D) such that the projections (E1) of said ejecting device (E) face and are aligned and centered with the third holes (Da) of the dispensing device (D), and successively exerting a pressure on said ejecting device (E) to transfer portions of said filling (R) from the dispensing device (D) onto an upper surface of said first portion of rolled dough (P');

removing said dispensing device (D) and ejecting device (E) and positioning a second portion of rolled dough (P''') inside the guide frame (A) so as to cover the portions of said filling (R) and the first portion of rolled dough (P');

inserting the second grid (B'') in said guide frame (A), superimposing and aligning the second grid (B'') with the first grid (B'), and successively exerting pressure on said second grid (B'') to press and join the first and second portions of rolled dough (P', P''') along edges of the first holes or openings (Ba) of said first and second grids (B', B'');

removing said second grid (B''), inserting the cutting grid (C) inside the guide frame (A), placing and aligning the cutting grid (C) with the first grid (B'), arranging the blades (C1) of the cutting grid to face the first grid (B'), and successively exerting a pressure on said cutting grid (C) to cut the first and second portions of rolled dough (P', P'''); and removing and separating the cutting grid (C) from the first grid (B') and from the guide frame (A) and detaching individual ravioli or filled pasta units.

\* \* \* \* \*